(12) United States Patent
Kaag

(10) Patent No.: US 10,686,660 B2
(45) Date of Patent: Jun. 16, 2020

(54) SYSTEM, DEVICE AND METHOD FOR CONSERVING ENERGY IN CONTROLLING NETWORK APPLICATIONS

(71) Applicant: SIGNIFY HOLDING B.V., Eindhoven (NL)

(72) Inventor: Bjorn Christiaan Wouter Kaag, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 125 days.

(21) Appl. No.: 15/755,959

(22) PCT Filed: Aug. 9, 2016

(86) PCT No.: PCT/EP2016/068959
§ 371 (c)(1),
(2) Date: Feb. 27, 2018

(87) PCT Pub. No.: WO2017/036746
PCT Pub. Date: Mar. 9, 2017

(65) Prior Publication Data
US 2018/0248757 A1    Aug. 30, 2018

(30) Foreign Application Priority Data
Aug. 31, 2015 (EP) ..................................... 15183131

(51) Int. Cl.
*G06F 1/00* (2006.01)
*H04L 12/24* (2006.01)
(Continued)

(52) U.S. Cl.
CPC .......... *H04L 41/0833* (2013.01); *H04L 12/10* (2013.01); *H04L 12/12* (2013.01); *H04L 12/40* (2013.01); *H04L 41/0803* (2013.01)

(58) Field of Classification Search
None
See application file for complete search history.

(56) References Cited

U.S. PATENT DOCUMENTS

| 5,130,659 A * | 7/1992 | Sloan ................. G01R 31/3835 |
| | | 324/435 |
| 2005/0136989 A1 | 6/2005 | Dove |

(Continued)

FOREIGN PATENT DOCUMENTS

| DE | 102008035544 A1 | 2/2010 |
| JP | 5067088 B2 | 4/2009 |
| WO | 2006055948 A1 | 5/2006 |

OTHER PUBLICATIONS

Subhash Dhar Dwivedi et al, "Energy Efficient Routing Algorithm with sleep scheduling in Wireless Sensor Network" (IJCSIT) International Journal of Computer Science and Information Technologies, vol. 3 (3), 2012,4350-4353.

*Primary Examiner* — Nitin C Patel
(74) *Attorney, Agent, or Firm* — Daniel J. Piotrowski

(57) ABSTRACT

The present invention relates to a control system, in particular a lighting control system, having a control line to control power modes of network components, such as data forwarding components as well as end nodes, e.g. application control components, according to a global application plan. Controlling the power modes may comprise switching off data-ports in the control network. A data-forwarding device having switchable data port can be used to switch off data paths "in efficio" through the control network. Furthermore, a protocol to interrogate the status of a network component as well as to receive a schedule for unattended operation is provided, thereby enabling improved energy usage and enhanced safety.

13 Claims, 6 Drawing Sheets

(51) Int. Cl.
*H04L 12/10* (2006.01)
*H04L 12/12* (2006.01)
*H04L 12/40* (2006.01)

(56) References Cited

U.S. PATENT DOCUMENTS

| | | | |
|---|---|---|---|
| 2007/0079156 A1* | 4/2007 | Fujimoto | G06F 1/3221 |
| | | | 713/300 |
| 2010/0271199 A1* | 10/2010 | Belov | G01M 5/00 |
| | | | 340/539.3 |
| 2011/0016336 A1* | 1/2011 | Mori | G06F 3/0625 |
| | | | 713/320 |
| 2013/0159754 A1 | 6/2013 | Wendt | |
| 2013/0339757 A1* | 12/2013 | Reddy | G06F 1/3212 |
| | | | 713/300 |
| 2014/0046498 A1* | 2/2014 | Nakayama | G05B 15/02 |
| | | | 700/295 |
| 2015/0094868 A1 | 4/2015 | Diab et al. | |

* cited by examiner

SYSTEM, DEVICE AND METHOD FOR CONSERVING ENERGY IN CONTROLLING NETWORK APPLICATIONS

CROSS-REFERENCE TO PRIOR APPLICATIONS

This application is the U.S. National Phase application under 35 U.S.C. § 371 of International Application No. PCT/EP2016/068959, filed on Aug. 9, 2016 which claims the benefit of European Patent Application No. 15183131.0, filed on Aug. 31, 2015. These applications are hereby incorporated by reference herein.

FIELD OF THE INVENTION

The present invention relates to application control networks, e.g. —but not limited to—lighting control networks. In particular the invention relates to the efficient use of the network components in dependence of application requirements as well as network topologies.

BACKGROUND OF THE INVENTION

In application control networks, such as—but not limited to—lighting control networks, data forwarding devices, are used to forward messages between different application control components, such as sensors and actuator of a lighting application. It is known from Heller et all, "ElasticTree: Reducing Energy in Data Center Networks", that present data-forwarding devices like data-forwarding devices are inefficient at low load. Presently, when being in an idle status—that is powered but not used for communication—a typical data-forwarding device uses only 5% less power compared to when these status in which the data-forwarding device is fully loaded with data transmission.

In wired application control environments an application device may be powered via Power Over Ethernet (i.e. PoE). From DE 10 2008 035544 A1 it is known to switch off respective PoE end devices by switching off the power supply to these end devices via a controllable switch integrated in the network card the respective end devices are connected to. An intermediate PoE device, such as a data-forwarding device, however, is an all ports on/off device, just like a normal Ethernet data-forwarding device without Power Over Ethernet functionality. A typical PoE data-forwarding device will thus require a relative high additional power budget to "keep the line alive". This is standardized in Ethernet standard "802.3 at" (i.e. "Eight-oh-two-dot-three-Alfa-Tango"). The Ethernet standard 802.3at for Power Over Ethernet requires a minimum standby power of 250 mW per port. In big installations with many nodes this amounts to large standby-power, not only from data communication equipment such as e.g. data-forwarding devices such as but not limited to data-switches and routers but also from the nodes that are attached thereto, such as electrical actuators/loads or sensors. This causes several problems:

- Large standby power generates heat and degrades the life of electronics, unless it is overdesigned to cope with that, which results in extra cost.
- Application end notes with large energy saving potentials such as LED's in the lighting sector, may become less substantial due to the standby power consumed by the data communication network.
- More ambitious requirements on "Energy Performance Calculations" for new buildings and/or renovations and reductions in energy use are expected in the context of sustainability.
- Energy loss in itself results in non negligible costs in moderate to large buildings.
- Energy loss of devices usually heats the surrounding air, which requires additional cooling, which in itself consumes additional energy and thus produces costs.

PoE equipment cannot be sent to 'sleep', meaning that the equipment is switched off entirely, since a PoE device would have to maintain a network interface in order to be able to receive a wake up command and therefore a PoE device requires power which it receives via Ethernet as well. But also switching off components with external power supply within the network might influence to overall network performance in an un-desired way, for instance, data paths may be cut off or be unduly prolonged.

SUMMARY OF THE INVENTION

It is thus an object of the present invention to enhance the efficiency of an application control network, in particular reducing the energy consumption while guaranteeing a required functionality and quality of service.

The object is achieved by the subject matter of the independent claims. Further embodiments are shown by the dependent claims.

The approach according to the present invention provides a control unit enabled to switch off network components or parts thereof in accordance with an application plan defining respective application scenes to save energy without losing capabilities of application control network. Data-forwarding devices having switchable data ports may be exploited to switch off data paths "in efficio". Furthermore, there is provided a protocol to interrogate the status of a network component, such as data forwarding devices or end nodes, such as application control devices. The protocol further provides distribution of a schedule for unattended operation to the network components thereby enabling improved energy usage and enhanced safety. The network components receiving the respective schedules can operate in respective power modes, e.g. being switched on or off, in accordance with the application scenes.

In an aspect of the invention there is provided a control unit for use in an application control network wherein the application control network comprises at least one application device communicatively coupled via a data-port of a data forwarding device with the application control network wherein the control unit is adapted to determine a power schedule for the data-port of the data-forwarding device in accordance with a predetermined application control scene and to provide the power schedule to the data forwarding and/or application device for autarkic power management during predetermined time slots determined in the power schedule during which the data forwarding and/or application device is adapted to power down its network interface providing the communicative coupling to the control unit.

In software defined application systems, an application scene may define the interaction of application components in an application control network. For instance, in a lighting control network as an example of an application control network, an exemplary lighting scene may define which lamps are to be switched on or off if a particular sensor is triggered. Based on the knowledge which application components are required in a particular application scene, the application components may be mapped to the network topology and the respective data paths through the application control network can be determined. The resulting paths are contained in an application control scene. In accordance with the application control scene the control unit may set the power mode of all data-ports of data-forwarding devices along the communication path which are not required in a respective application control scene to a hibernate mode, e.g. switch them off. Switching off the data ports along data communication paths which are not required in an application control scene may result in significant energy savings. For those data ports along the communication paths required in accordance with the application control scene, the power mode may be set to normal operation, e.g. on.

In an embodiment of the present invention the application device is powered via the data-port of the data forwarding device. An application device powered via the data-port, e.g. powered over Ethernet, will not receive any energy if the data-port is switched off. Hence, further energy can be saved. However, in order to ensure that the application device is not switched off when it is needed, the data-port may only be switched off in accordance with the application control scene which provides knowledge when the application component is needed, e.g. specific time slots during the day, week or year. As an example, an ordinary office building will most likely not be used at night. Thus, a lighting scene for the time slot between midnight and 4 am. may require only minimal lighting equipment that may be activated for instance if the night guard is passing by, a plurality of detection sensors and lamp actuators of the building may be switched off.

In an embodiment of the present invention the control unit is further adapted to determine whether the application device is authorized to be coupled to the data-port of the data forwarding device and deactivate the data-port of the corresponding data forwarding device if it is determined that the application device is not authorized. Having a control unit with knowledge about the application plan, e.g. light plan showing lights and sensors installed in each room of a building, and corresponding knowledge about the network architecture, an unauthorized access to the network can be prevented by recognizing a new application component and cutting off the network access by selectively disabling the data port corresponding to the socket the application device is plugged in. Hence, providing a control unit that may control data forwarding devices down to port level can further help to improve network security.

In another aspect of the invention there is provided a method for controlling an application device and/or data forwarding device within a application control network, wherein the application device is connected to a data port of the data forwarding device and the method comprises the steps of
  determining whether the application device coupled to the data-port of the data forwarding device and/or a data forwarding device is needed for a predetermined period of time, and/or
  determining whether the application device is authorized to be coupled to the data-port of the data forwarding device,
  providing a power schedule to the application device and/or a data forwarding device for autarkic power management during predetermined time slots determined in the power schedule during which the data forwarding and/or application device is adapted to power down its network interface which provides a communicative coupling to the control unit.

Additionally to determining whether a particular data path is needed for an application scene, it may also be determined whether an application control component is authorized to be coupled to a data path, e.g. via a data port of a data forwarding device. Based on the knowledge about the application control components present in one or more application scenes, it can be determined whether an application control component is authorized. If not needed for routing or in case of detecting an unauthorized application control component being plugged to a data-port, the respective data port may be set to a hibernate mode, thus effectively, switching off the corresponding data path.

In another aspect of the invention there is provided a computer program executable in an processing unit, the computer program comprising program code means for causing the processing unit to carry out a method as defined in the previous aspect of the invention when the computer program is executed in the processing unit.

In another aspect of the invention there is provided an apparatus for use in an application control network, wherein the apparatus comprises a network interface to receive control messages from or send messages to other components within the application control network. The apparatus further comprises a storage unit for storing a schedule provided by a control message from a control unit via the network interface, wherein the schedule comprises information indicating different power modes of operation for the apparatus for specific time slots of operation; and a processing unit for processing the schedule to operate the apparatus in different power modes for a predetermined time in accordance with the schedule, wherein the apparatus is adapted to power down its network interface which provides a communicative coupling to the control unit in accordance with at least one predetermined time slot in the schedule.

In order to be operational, network components (such as end nodes in form of application control components (such as e.g. but not limiting to sensors and actuators in a lighting application) but also intermediate components (such as e.g. data-forwarding devices)) need their network interface to be powered in order to be able to react on incoming control commands. In order to switch to other power modes, such as a hibernate mode, e.g. switching off the apparatus, it has to be ensured that the apparatus powers up again when it is needed. Therefore, the apparatus is provided with an operation schedule by a control unit defining the modes of operation for specific timeslots of operation. Thus, the apparatus may go to a low power mode, e.g. hibernate, for a predetermined time in which no incoming control message is to be expected and switches back to normal operation mode in accordance with the provided schedule at a time in which a message may be expected. That way, the apparatus may be controlled in an energy efficient way without losing network performance due to non responsive components.

In an embodiment of the present invention the apparatus is powered via the network interface and comprises an energy storage unit adapted to store an amount of energy sufficient to power up the apparatus after a predetermined time in which the apparatus has been set to a hibernate mode in accordance with the schedule, wherein the apparatus is unable to receive energy via the network interface during the hibernate mode. When a node in a network system is powered via the network interface, e.g. powered over Ethernet (PoE), powering down its network interface would result in a dead link, since it requires an active network interface to receive energy in order to receive a command to power up the network interface. Hence, an energy storage unit is used to store an amount of energy sufficient to power up the apparatus after a predetermined time in which the apparatus has been powered down in accordance with the schedule.

In an embodiment of the present invention the apparatus further comprises a monitoring unit to monitor a status of the energy storage and initiate a recharge if the amount drops below a predetermined value. In order to guarantee an amount of energy sufficient to power up the network interface a monitoring unit may determine the energy degradation and initiate a recharge by changing the power mode to a status that allows a battery recharge, but may still keep energy consumption low, e.g. by remaining in an off state with respect to receiving data messages.

In an embodiment of the present invention the apparatus is configured to periodically power up after a predetermined time in which the apparatus has been set to a hibernate mode in accordance with the schedule, to request an update of the schedule. To avoid occurrences of any deadlinks, e.g. routing paths needed in accordance with an application scene but interrupted or switched off in accordance with another outdated application scene, it has to be ensured that the apparatus periodically powers up and requests an updated schedule. Especially, for application scenes with long duration such a routine may be important to ensure proper data routing through the network. The apparatus may further be configured keep the network interface operational if the requested update of the schedule is not received. As a precaution, an apparatus may only go to a hibernate mode in case the schedule is up to date.

In an embodiment of the present invention the apparatus is a data-forwarding device for passing messages within the control network. Much like an end node which is temporally not required according to the application scene also an intermediate data forwarding device may be set to a power saving mode by a network control unit that has knowledge about the time slots the entire data forwarding device is not required in accordance with an application control scene. Hence, the data-forwarding device may be provided with a schedule with time slots in which the data-forwarding device may be switched to a low power mode or even set to a hibernate mode.

In an embodiment of the present invention the data forwarding device comprises one or more data-ports connectable to different components within the control network and the schedule provided from the control unit defines separate power modes for the respective data ports. In this case different power modes also comprise setting selected data-ports of the data-forwarding device to hibernate, thereby cutting of specific data communication paths through the network and thus providing further granularity to the application control scene.

In an embodiment of the present invention the apparatus comprises clock circuitry to maintain an updated clock and wherein the processing unit for processing the schedule only operates the apparatus in a different power mode after having verified that an internal clock of the apparatus is up to date. As a precaution the apparatus may only change to another power mode and thus may become unreachable from outside, if it verified that an internal clock of the apparatus is up to date. In general a clock can suffer from clock drift or may otherwise not be properly configured. To cope with an attack where a hacker will manipulate the clock or when the clock has not yet been configured (for example upon installation), the device will operate in a fail-safe mode, being status "on". A secure clock protocol may be used such as e.g. PTP or NTP.

It shall be understood that the control unit of claim 1, the method of claim 4, the computer program of claim 5 and the apparatus of claim 6 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Some embodiments are exemplary described in the context of lighting control applications. However, it is to be understood that the embodiments are not restricted to lighting control. The person skilled in the art will appreciate that the methods and devices may be exploited for any other control application requiring a similar topology.

In the following a software defined application (SDA) system provides knowledge about application specific requirements and instructions as stipulated in an application plan. For instance, an example of a SDA system is a software defined lighting (SDL) system that defines an lighting plan comprising one or more lighting scenes. A lighting scene may define which lamps are to be switched on if a particular sensor is triggered.

A network management system such as a software defined networking (SDN) system provides knowledge about the respective network components present in a mesh network and may control configuration of routing tables and the like. However, the network management system does not know about application specific connections between certain network components.

Together the SDA system and the SDN system constitute a software defined control (SDC) system which combines both layers (application and network). The SDC system maps the application/lighting components onto the network topology and thus has the knowledge to decide which components or component parts may be switched off without degrading the capability of the (lighting) control network to execute a (lighting) application.

In some embodiments a fully automated lighting control system may be used that saves energy by analyzing all data paths possible to realize a lighting control scene as described in co-pending application (ID 02752), and select the path that results in minimal overall energy consumption of all components. Usage patterns accumulated from the particular lighting control application are used to select the path based on criteria such as time, frequency, duration, energy usage, etc. Based on optimization techniques, the system may predict and pro-actively minimize energy usage of the data paths for all control scenes. In a communication network that is shared with other control applications, control applications may interact with one another to improve decisions for the maximum overall energy savings and avoid fratricide.

Figure 1:
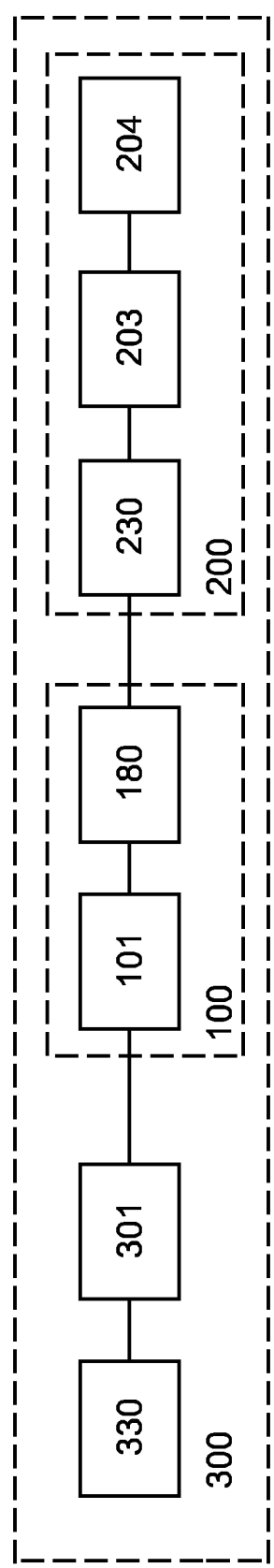
FIG. 1 shows an exemplary embodiment of a domain model for energy efficient application control.

FIG. 1 shows an exemplary application control network 300 which comprises a set of application control components 301 such as sensors to detect a signal and actuators to switch an electrical load. The application control components 301 may be powered by a wired communication link or alternatively by an optional energy source or storage 330. The application control components 301 may be connected via wire or wirelessly to a border network component 101, which is part of communication network 100. The border network component 101 is connected to the management system 230 via a network path in between 180. The network path in between 180 is capable of passing and forwarding data according to rules (so called 'data path definitions') programmed by the network management system 230. The SDA system 203 has knowledge of the application plan 204, which stipulates which lighting control components 301 are required to engage in respective application control scenes. The SDA system 203 may as such generate the information that is required to switch off one or more application control components in the application control network 300, e.g. any subset of sensor(s) or actuator(s). The SDA system sends power change commands (on/off/idle/other power status level) to the respective application control components. Furthermore, the SDA system 203 controls the network management system 230 to program the correct communication paths (filters with correct duration and addressing) which are required to ensure that the application control components may receive the required control messages through the network. Having the knowledge about the required application control components for an application scene as well as the required communication paths between them, the SDA system can also determine network components such as data forwarding components to be switched off and on depending on the application needs. For instance, if a communication path is not required for a certain time it may be beneficial in terms of energy savings to switch off the data forwarding device along this communication path. Hence, the SDA system may also send power change commands (on/off/idle/other power status level) to the respective data forwarding components. Usually, a data forwarding component provides several data ports for communication with respective other data forwarding components or application control devices, thus, providing a plurality of communication paths. In case only one of these communication paths is not required the SDA system may provide instructions to switch off only a single communication path by setting the respective data port of the data forwarding device to a hibernate mode.

One exemplary control application is a lighting application. The lighting control network 300 according to FIG. 2 comprises data switches having separately switchable data-ports. The lighting control network 300 comprises a variety of lighting control components, such as for example but not limited to a lamp 303, a presence detector 304 with Passive InfraRed (i.e. PIR) sensor, a light switch sensor 305, in short any sensor 306 which can interact with any actuator 302 as required and as may be stipulated in the lighting plan 202. Each example of the sensors and actuators mentioned above may be connected to a switchable data port 121 to 125 of data forwarding component 102. The switchable data port can switch or alter the status of the power to on/off or a power level in between. When a PoE device is connected to a part, the part also serves as power part. The switchable data/power ports (in the example 121 to 126) may be controlled by switch control module 120. The switch control module 120 can receive and process messages to switch a data-port on/off/idle or a power setting in between. The southbound module 110 will run a data protocol for interconnection with the network management system 231, which may be an SDN system, and/or with the SDL system 201. The forwarding module 130 implements rules how to forward data between data-ports. The modules 110, 120 and 130 may be implemented as software processes running on a micro-processor 140 using memory module 141 for execution and storage module 142 for storing computed results, the time schedule as well as the firmware. In addition, the lighting control network 300 may deploy wireless sensors 311 and/or wireless actuators 310, which are connected via a wireless bridge to the communication network 100. Traffic between sensors, actuators and the SDL system 201 is transported via a network path in between 180, which is under control of the SDL system. The network path in between 180 may be a hybrid of data switches that can or cannot support changing power status of the data-forwarding device as a whole and the respective data-port(s) in particular. Instead of a data-forwarding device, another embodiment could be a router or another data forwarding component that works with filters to forward data.

Figure 2:
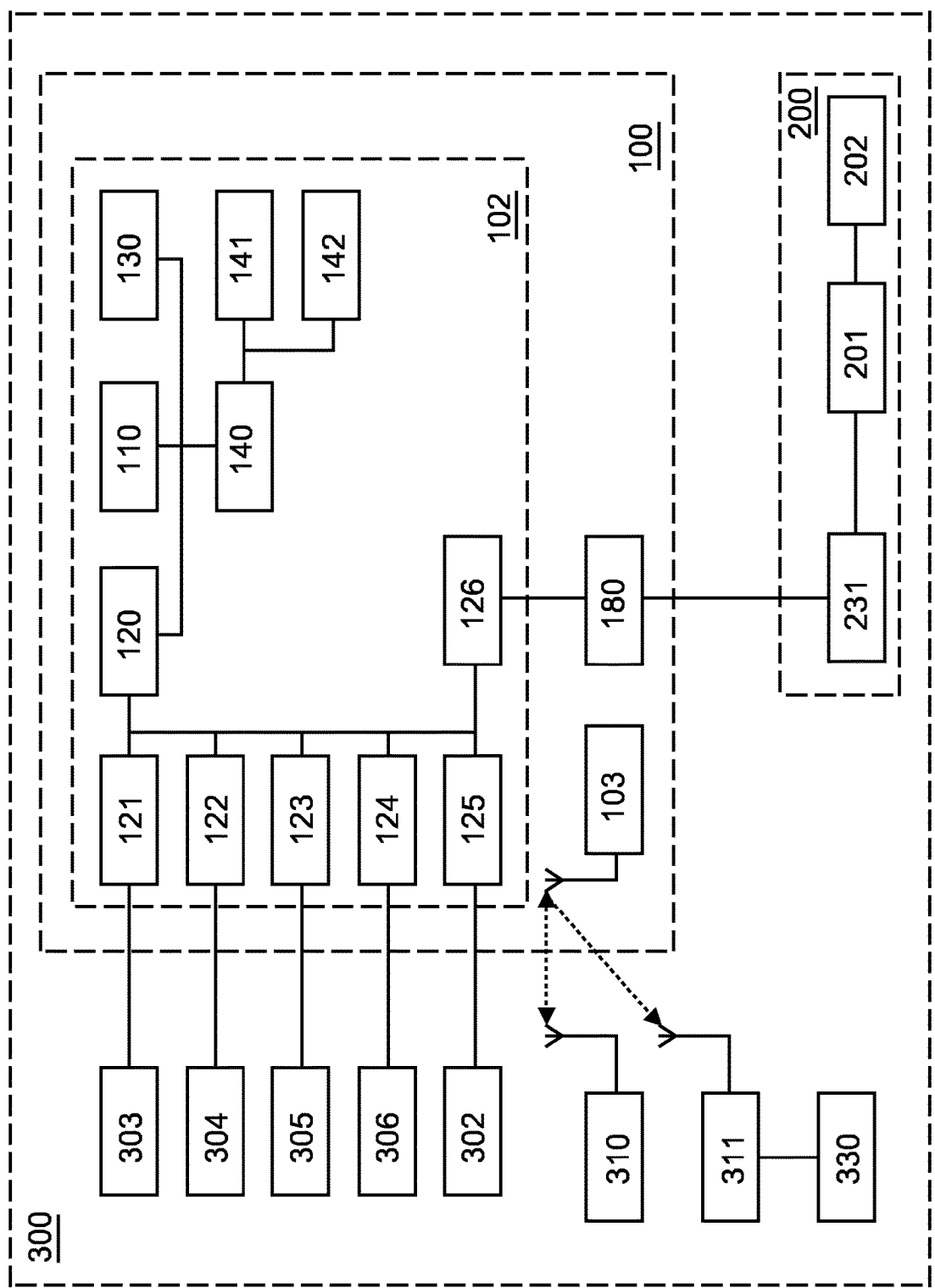
FIG. 2 shows a system diagram of an energy efficient SDA control system.

The SDC system 200 as depicted in FIG. 1 and FIG. 2 analyses the "best" path based on a control plan including knowledge of a plurality of application control/scenes (e.g. time, frequency and duration) as well as other constraints such as energy a consumption, etc., and combines all required paths for all components as described in detail in co-pending application ID 02752. The communication paths or flow definitions may be provided to the network components to program the routing tables and the like.

Figure 3:
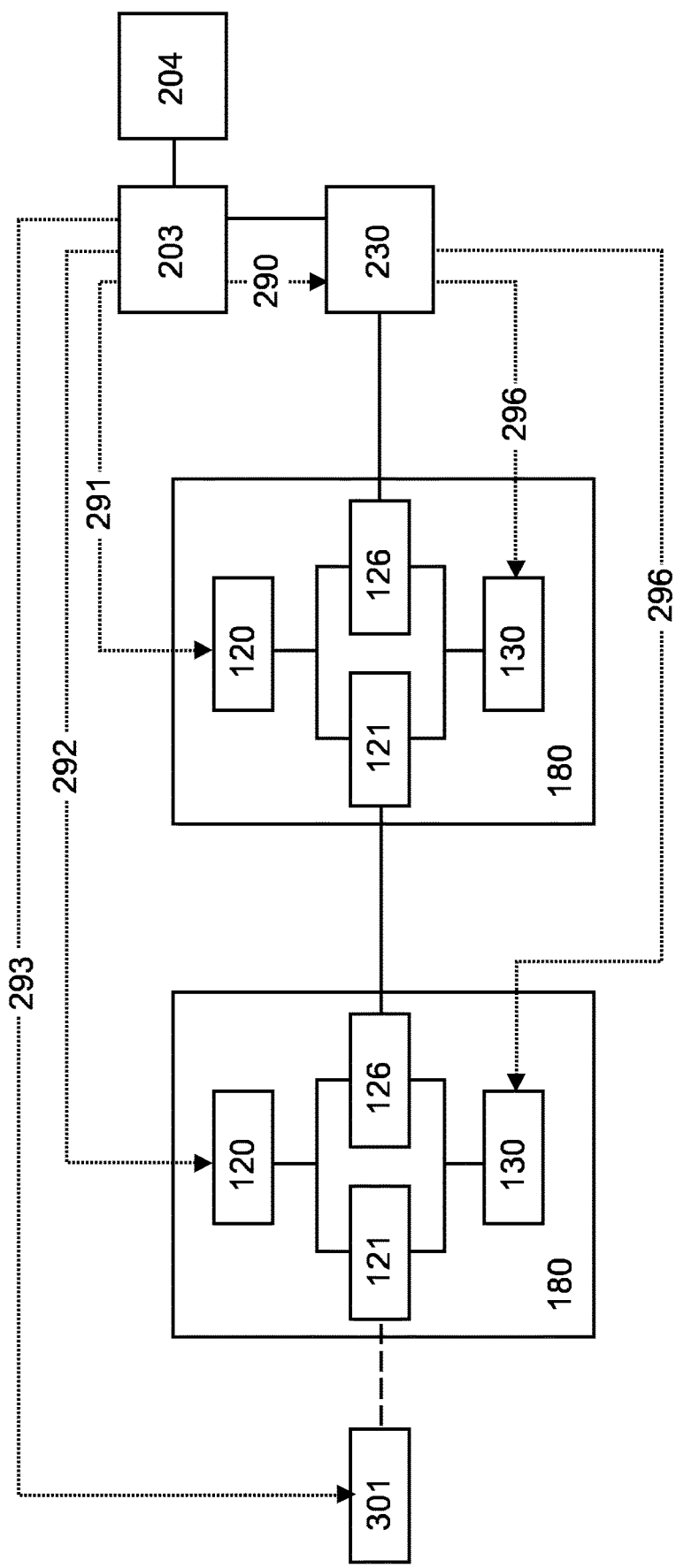
FIG. 3 shows control lines from an SDA system (e.g. SDL system) to the network components, end nodes and data-forwarding devices.

In order to switch on/off or otherwise change the status of the communication and/or power level of lighting control components and/or data forwarding devices within the application control network, the SDA system 203 has functional control lines to the relevant network components 101, 180 and exemplary 301 (e.g. could be any sensor 306 or actuator 302), as shown in FIG. 3 and the table below:

| Control line | Software Defined Application System 203 exerts control over . . . | By managing . . . |
|---|---|---|
| 290 | Data forwarding rules (i.e. filters) | SDN data path definitions |
| 291 | Data-port(s)/data forward device(s) | Power state of port/device |
| 292 | Data-port(s)/data forward device(s) | Power state of port/device |
| 293 | Sensor and/or actuator device | Power state of device |

It shall be understood that the control lines 290 to 293 can be separate protocols or bundled (wholly or partly) in respective network management protocols, such as SDN protocols. The lines 296 represent the interface between the network management system (e.g. an SDN system) and the devices 101, 180 and 302 used to forward data over the interlink between the data ports that are controlled by control lines 291, 292, 293.

Figure 4:
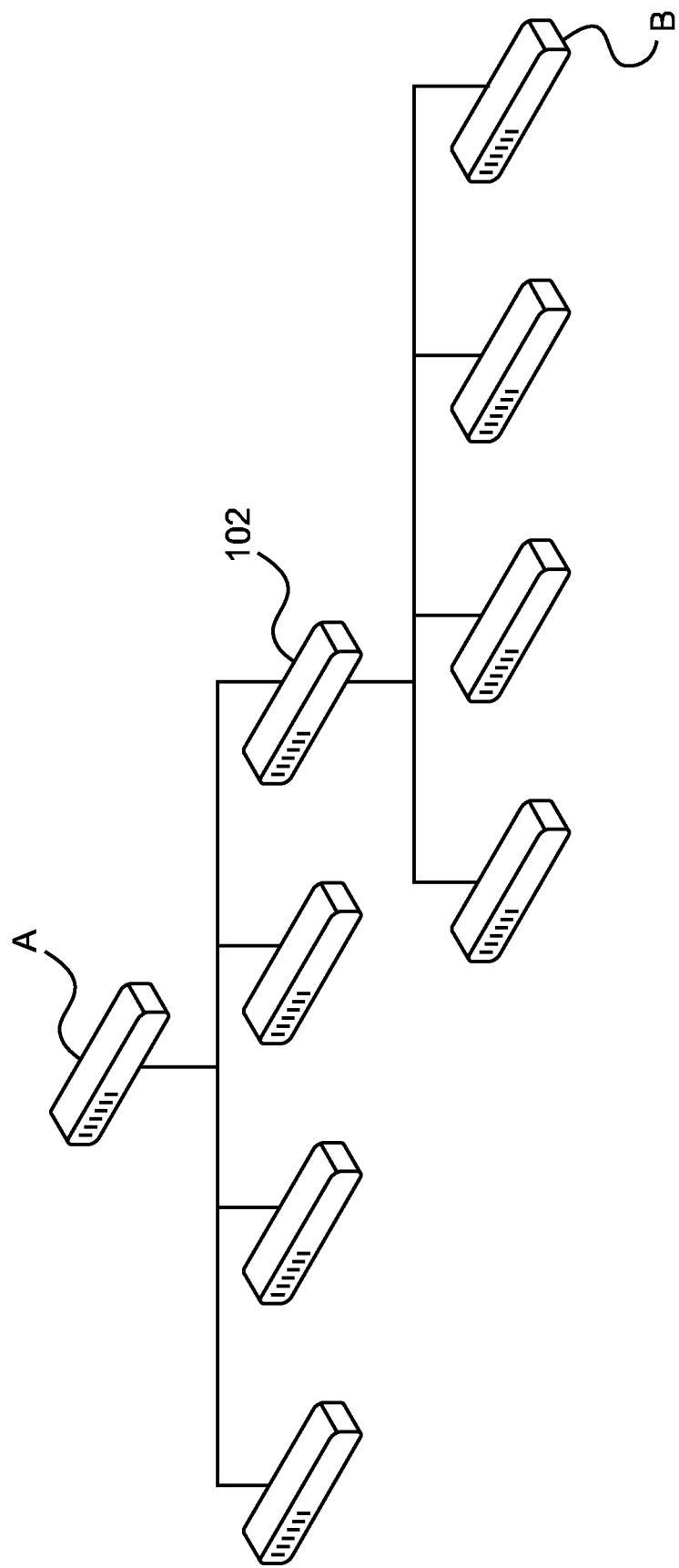
FIG. 4 shows a cascading of network switches.
Figure 5:
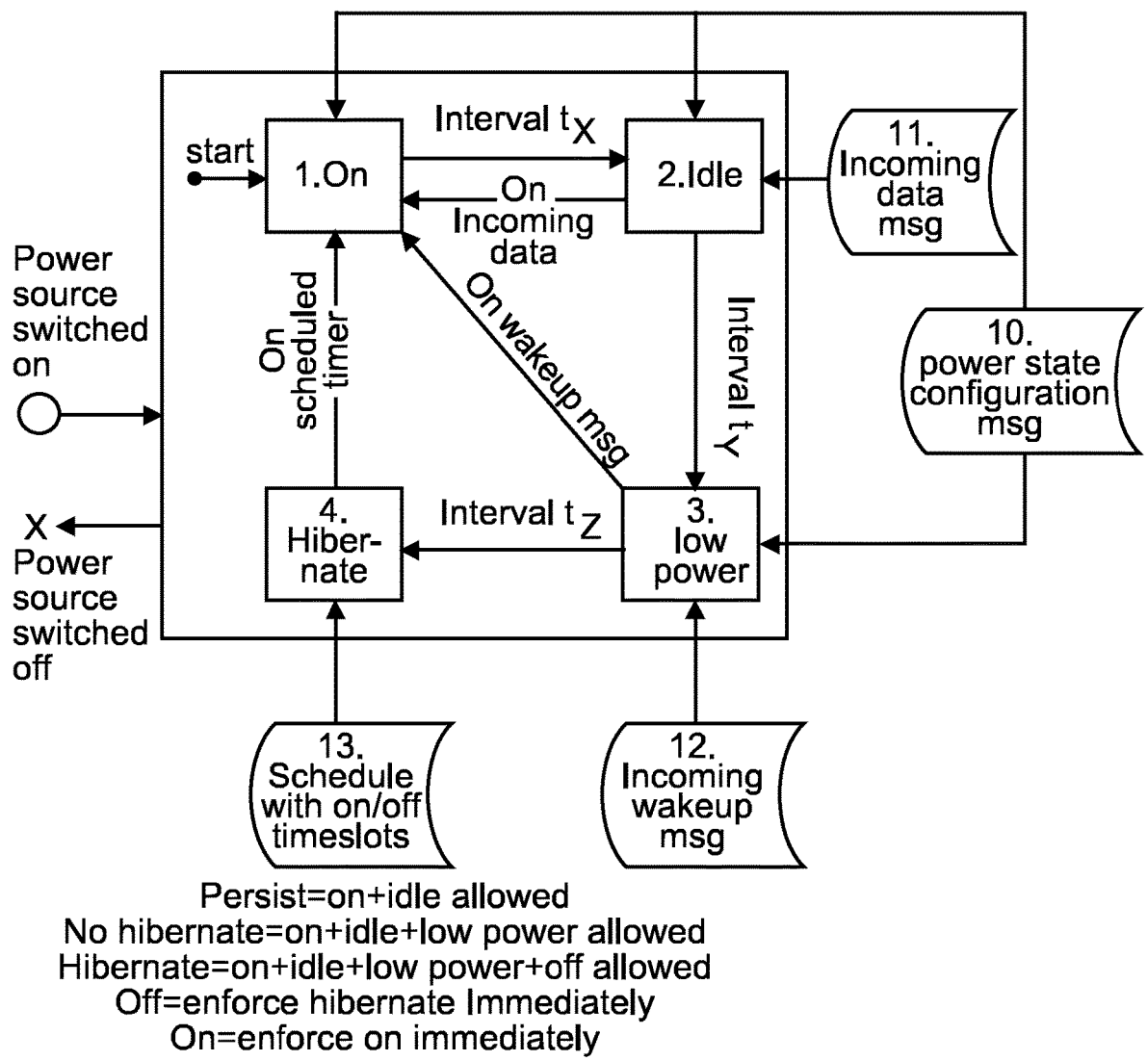
FIG. 5 shows a diagram of different power states of a network interface as well as the transition mechanism between the respective power states.

A data-port on a power controllable data forward device (i.e. data switch) can be programmed through various power states. In addition, it may be beneficial to interrogate the actual power status of a (data-port on a) data-forwarding device. An exemplary embodiment is discussed in following. Potential power savings may be the number of data ports on the data switch that do not require to be powered. However, in a typical communication network topology, data-forwarding devices may be cascaded as depicted in FIG. 4. In such a topology, a data-forwarding device 102 somewhere in between the beginning A and end B of the data path may need to accommodate 1 input port and 1 output port remaining under power to be able to forward data from A to B. But even in such a situation, the SDC system may determine certain timeslots where it is very conceivable that no data will pass via particular paths. In those situations the SDC system may program the data-forwarding device and its data-ports to be switched off. Naturally, when a component in the data network is switched off, either entirely or the data-ports that are relevant for the communication path, forwarding of data messages is not possible anymore. Thus, there is a risk that a communication path through the mesh network may collapse and remain in an inoperative state if the components along the path cannot reliably be switched on again. A protocol may be used to ensure configuration of only allowable power states of the data-ports on a data switch. In combination with a fallback capability the protocol will prevent dead communication links. A corresponding flow diagram is shown in FIG. 5.

In state 'on' (1) the data-port of a data switch is powered for communication and/or power delivery to a device connected to and in communication with the data-port. The data-port may provide a signal to its surrounding or to the SDC system.

After a certain amount of time $t_X$ has passed without any communication being received at the data port, the data port may be switched to the state 'idle' (2). In this state the data port is still powered although it does not receive any communication. Any incoming data communication, however, triggers the data port to switch back to state on. The power consumption in the idle state is thus only slightly smaller than in power state on.

In state 'low power' (3) the data port has a power mode where it cannot directly react to data communication, but still listens. Upon reception of a wakeup message it will switch to state on, ready to process communication. The data port may be switched to low power after it has remained in state idle for a predetermined time $t_Y$.

In state 'hibernate' (4), the data-port is not powered for communication and/or power delivery and will not be usable for data communication. In order to reactivate the data-port, the data switch must be provided with information, for instance a defined timeslot, in which it should power up again by itself.

Without a specific configuration by the SDA system based on a particular application plan, the data ports may only switch between the states on 1, idle 2 and low power 3, using some default values for timers $t_X$ and $t_Y$. However, when configured by the SDA system in accordance with a corresponding control plan, the components in the control network may be switched to status low power 3 and status hibernate 4 whenever appropriate to save energy consumption.

As indicated above a default fall back mechanism described herein below ensures that a network component, in particular a data-forwarding device, periodically powers up from status hibernate 4 to status on (1). It may notify the software defined control system of its status/existence in order to receive a configuration message 10, which may comprise a schedule defining on and off timeslots that may be specified down to a single data-port and a single data-flow. Furthermore, the configuration message 10 may specify time intervals $t_X$ and $t_Y$ and/or $t_Z$. In an exemplary implementation subsequent reception of such power state configuration messages 10 may allow the data-port to switch between all states from on 1, idle 2, low power 3 to hibernate 4. When a power state configuration message 10 is not received, the data-port may remain in state on, until it is programmed by the SDA system.

The data switch will manage which data path of a plurality of possible data paths takes precedence and when to ultimately change the power status to a power saving state in order to avoid a non-operational communication link.

The protocol enables the SDL system, either directly or via the SDN system, to program interval $t_X$, $t_Y$, $t_Z$ as well as the schedule with timeslots. The protocol also enables the SDL system to interrogate the current status of the data-ports as well as the actual schedule of the data-forwarding component.

Figure 6:
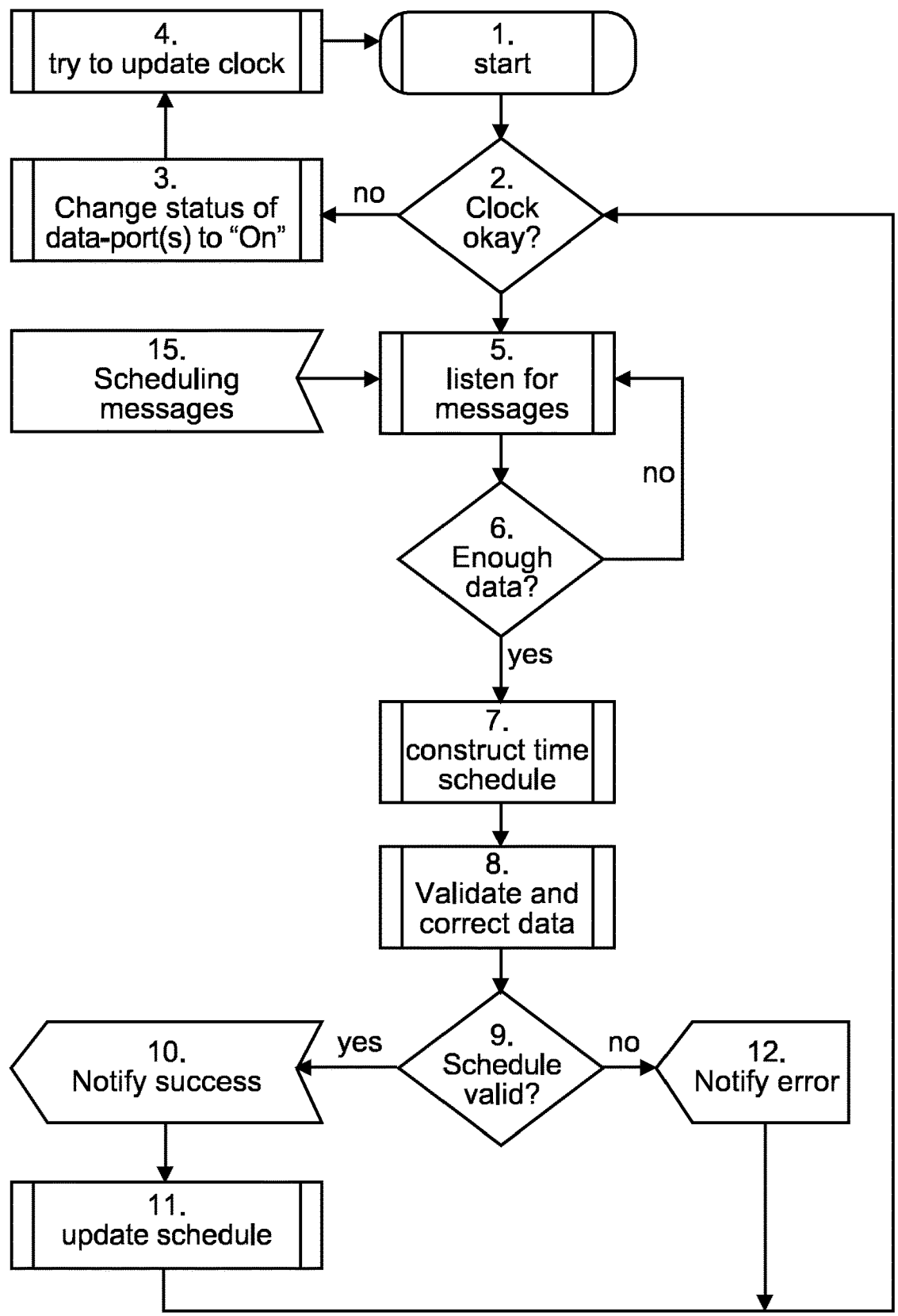
FIG. 6 shows a flow diagram for re-constructing a time schedule.

FIG. 6 shows a flowchart of a method to prevent falsely programmed dead links. Any device enabled to process schedules for unattended operation within the lighting control network which is instructed to go to state hibernate has to maintain an updated clock. When no time can be determined (2) the device will only operate in the state on (3) and attempt to update its clock (4).

If the clock is okay (2), the device will listen via its control network interface for appropriate messages (5) with scheduling information (15) sent by the SDC system via the control network.

Periodically and/or after a certain amount of data has been received (6) from the SDC system, the device will try to reconstruct a time schedule (7) from the data messages it received. This time schedule may define one or more subsequent timeslots.

If the device has an updated clock that corresponds to the time of the system, the device may process the time schedule.

The time schedule specifies the mode of the network component, especially the data-forwarding device, the data route (i.e. path), start and stop time. To enhance flexibility and reduce data load for this provisional data protocol, many options could be conceivable for such a schedule, such as different block granularity, definition of very large and short time windows, checksums, etc.

The device will check and filter for certain precedence of scheduled events (8), and avoid double definitions. The requirement for a functioning data-port will always take precedence over a requirement to switch the data-port to hibernate or off during a(ny) period of time. A resultant dead-link that is not available on time is thus not allowed.

An example of an arbitrary time schedule for switching data ports (and achieve energy saving "in efficio") is shown the Table below:

| Path ID# | Mode | Route | Block granularity | Start time (current t) | Stop time (current t + n* block) | Check-sum |
| --- | --- | --- | --- | --- | --- | --- |
| 1 | Persist | a-b-c | 10 seconds | Time t1 | Time t1 + 3 | CS1 |
| 2 | No_Hibernate | b-c-d-g-h | 15 mins | Time t1 | Time t1 + 3 | CS2 |
| 3 | Hibernate | b-c | 60 mins | Time t1 | Time t1 + 1 | CS3 |
| 5 | Persist | c-f-g-h-s | 60 mins | Time t2 | Time t2 + 24 | CS4 |
| 8 | On | * | 30 mins | Time t3 | Time t2 + 1 | CS5 |
| 9 | Off | d-e-f-h-k | 5 mins | Time t4 | Time t3 | CS6 |
| 21 | Hibernate | x-y-z | 60 mins | Time t5 | Time t4 + 4 | CS7 |

If the schedule is valid (8) the device may notify success and update the schedule in storage, such that it and the procedure can be processed by the switch control module 130.

If the schedule is not valid, an error is notified and the device will start all over again. The device may or may not invalidate the present schedule.

Especially for data path definitions with long duration, using larger granularities in the time schedule may lower the provisional load of data messages onto the network and provide robustness of network operation when the SDL system should, for whatever reason, not be available. The SDL/SDC system shall align the duration of the time schedule with the definition of data path definitions.

Is shall be understood that a data protocol implementing the schedule may carry a schedule as a whole or may only carry information from which the schedule is to be constructed.

When a time schedule is expired or when the timeslots in the time schedule are expired, the device will fall back to an "always on" mode to avoid dead links.

Having a management system, such as an SDC system, with control lines to all essential data ports along a data path between the respective sensor(s) and actuator(s) that interact in a lighting control scene allows for an interesting capability to minimize energy consumption. A lighting control network based on data-forwarding devices has a relative high idle energy usage, and the lighting control messages on a control networks do not consume a lot of bandwidth. An SDC system can monitor lighting control commands and extract patterns, e.g. time windows during the day, when there are a lot of commands and when there are hardly any commands or even none at all. These patterns strongly depend on the specific application, e.g. location of the actual positions (building, room) where the sensors and/or actuators are installed. If determined that certain lighting control devices are not required during a specific time slot, these devices as well as the data-ports of the corresponding data-forwarding devices serving the respective lighting control devices may be switched off. Accordingly, certain data communication paths through a communication network are switched off. However, according to the extracted patterns the SDC system knows when each of the communication paths needs to be switched on again. The SDC system, thus, can provide timing schedules for on and off states to the data-forwarding devices. The data-forwarding device needs to process this information and reliably switch off and on again if and when required to do so. Since communication, including the provision of further control messages, is not possible anymore once the data-port is switched off, the data-forwarding device include a fallback method to avoid a dead device once it is programmed to switch off. This process can be fully automated without any manual configuration, prior or during usage of the system. The system will manage itself according to the actual usage of the control network.

Having an application management system, such as an SDC system, with a control line to all essential data ports along the data communication path between the respective sensor(s) and actuator(s) that interact in a lighting control scene also allows for an interesting capability to enhance security.

The SDC system will enhance security by automatically "patching" data-ports. Normally, data-ports that are not used and which are not required are switched off. An attacker can still physically connect a cable into the lighting control network in an attempt to connect a manipulation tool or sensors or actuators into the network. However, when the corresponding data port of the data-forwarding device is unpowered, it does not provide any communication possibility. Therefore, it is impossible for the attacker to get an operational communication link to the control network.

Whenever a new component is added to a lighting control network the SDC system, which maintains the global lighting control plan, can compare the new status with the previous status and check if the new component is legitimate or authorized. In other words, the SDC system knows:

which sensor(s) and actuator(s) are registered/present in the lighting control network;

which sensor(s) and actuator(s) interact in which lighting control scenes.

the possible data communication paths between those respective components.

If the SDC system is not in a mode where it accepts new components into the lighting control network, it will compare the new component with the previous situation. If decided that the new component has no function to play, switch the communication path effectively off by setting the respective data port to state hibernate.

In the hibernate mode 4, as depicted in FIG. 8, a new device may connect its cable socket to the data port of a data-forwarding device, but the data-port will not notice the new device, since the corresponding port or serving link is not switched on. It may be a long time before the schedule will allow the data-port to switch back on again. To ease registration of new devices, a power cycle will reset the state machine of the flow diagram in FIG. 8 and the state machine will start the data-port as per default in status "On".

In order to allow installation of new components a special mode may be set, in which new devices may be registered in the system.

However, when the SDC system is not in a special mode where it is allowed to register new devices, the SDC system compares a new device with a snapshot of previously known devices and decides if it could enter the control system or if this is not allowed. If not allowed, the SDC system may keep the respective data-port in the hibernate state.

Should the attacker try to connect the cable sockets to other data-port sockets on the same data switch or on another data-forwarding device, the SDC system may trigger an alert. Using the network topology, preferably as a visual map with physical components, in combination with the lighting control plan, the SDC system may indicate the approximate physical position (room/hall section) where the attack occurred. The alert may be presented to a user via a GIS using a building map, a relative coordinate, a facility management code of a room, or via entirely different means. The SDC system has accumulated knowledge about lighting scenes that certain sensors and actuators (e.g. lamps and switches) interact with each other in certain spaces (e.g. rooms). The SDC system may combine the information with the representation of the communication network as a visual map to locate the data switch or data port where the attack originated.

The invention claimed is:

1. An apparatus for use in an application control network, the apparatus comprising:
 a network interface to receive control messages from or send messages to other components within the application control network;
 a storage unit for storing a schedule provided by a control message from a control unit via the network interface, wherein the schedule comprises information indicating different power modes of operation for the apparatus for specific time slots of operation; and, a processing unit for processing the schedule to operate the apparatus in different power modes for a predetermined time in accordance with the schedule;

wherein the apparatus is adapted to power down its network interface which provides a communicative coupling to the control unit in accordance with at least one predetermined time slot in the schedule such that during said at least one predetermined time slot, communication with the application control network is not possible; and wherein the apparatus is adapted to restore power to the network interface during a subsequent predetermined time slot.

2. The apparatus according to claim 1, wherein the apparatus is powered via the network interface and comprises an energy storage unit adapted to store an amount of energy sufficient to power up the apparatus after a predetermined time in which the apparatus has been set to a hibernate mode in accordance with the schedule, wherein the apparatus is unable to receive energy via the network interface during the hibernate mode.

3. The apparatus according to claim 2, further comprising a monitoring unit to monitor a status of the energy storage and initiate a recharge if the amount drops below a predetermined value.

4. The apparatus according to claim 1, wherein the apparatus is configured to periodically power up after a predetermined time in which the apparatus has been set to a hibernate mode in accordance with the schedule, to request an update of the schedule.

5. The apparatus according to claim 4, wherein the apparatus is configured to keep the network interface operational if the requested update is not received.

6. The apparatus according to claim 1, wherein the apparatus is a data-forwarding device for passing messages within the application control network.

7. The apparatus according to claim 6, wherein the data forwarding device comprises one or more data-ports connectable to different components within the control network and the schedule provided by a control message from the control unit defines separate power modes for the respective data ports.

8. The apparatus according to claim 1 wherein the apparatus comprises clock circuitry to maintain an updated clock and wherein the processing unit for processing the schedule only operates the apparatus in a different power mode after having verified that an internal clock of the apparatus is up to date.

9. The apparatus according to claim 1, wherein the apparatus is an application control component.

10. The apparatus according to claim 1, wherein the application control network is a lighting control network and the apparatus is a lighting control component, in particular an actuator or a sensor.

11. The apparatus according to claim 1, wherein each of said other components are not comprised in the apparatus.

12. A method for controlling an application device coupled to a data forwarding device within an application control network, wherein the application device is connected to a data port of the data forwarding device and the method comprises:

determining whether the application device coupled to the data-port of the data forwarding device is needed for a predetermined period of time, and determining whether the application device is authorized to be coupled to the data-port of the data forwarding device, providing by a control unit, a power schedule to the application device for self-sufficient power management during at least one predetermined time slot determined in the power schedule, during which time slot the data forwarding device is adapted to power down its network interface which provides a communicative coupling to the control unit such that communication with the application control network is not possible; and wherein the data forwarding device is adapted to restore power to its network interface during a subsequent predetermined time slot.

13. A non-transitory computer readable medium containing computer instructions stored therein for causing a computer process to perform the steps of the method according to claim 12.

* * * * *